United States Patent
Zielinski et al.

(10) Patent No.: US 9,453,463 B2
(45) Date of Patent: *Sep. 27, 2016

(54) HIGH EFFICIENCY, HIGH PRESSURE GAS TURBINE ENGINE FUEL SUPPLY SYSTEM

(71) Applicant: HONEYWELL INTERNATIONAL INC., Morristown, NJ (US)

(72) Inventors: Edward Zielinski, South Bend, IN (US); Paul W. Futa, North Liberty, IN (US); David Tuttle, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 591 days.

This patent is subject to a terminal disclaimer.

(21) Appl. No.: 13/827,838

(22) Filed: Mar. 14, 2013

(65) Prior Publication Data

US 2014/0196463 A1   Jul. 17, 2014

Related U.S. Application Data

(60) Provisional application No. 61/753,595, filed on Jan. 17, 2013.

(51) Int. Cl.
*F02C 7/236* (2006.01)

(52) U.S. Cl.
CPC .................... *F02C 7/236* (2013.01)

(58) Field of Classification Search
CPC .......... F02C 7/236; F02C 7/22; F02C 7/232; F02C 7/222; F02C 9/263; F02C 6/18; Y02E 20/16; Y02E 20/18; Y02T 50/675
See application file for complete search history.

(56) References Cited

U.S. PATENT DOCUMENTS

| | | | |
|---|---|---|---|
| 2,955,609 A * | 10/1960 | Gaubatz | F02C 7/22 137/114 |
| 3,946,551 A | 3/1976 | Linebrink et al. | |
| 4,245,964 A | 1/1981 | Rannenberg | |
| 5,110,269 A | 5/1992 | Fallon | |
| 5,118,258 A | 6/1992 | Martin | |
| 5,299,920 A | 4/1994 | Stearns | |
| 7,497,083 B2 | 3/2009 | Yates et al. | |
| 8,166,765 B2 | 5/2012 | Baker et al. | |
| 8,205,597 B2 | 6/2012 | Brocard et al. | |
| 8,276,360 B2 | 10/2012 | Poisson et al. | |
| 2008/0289338 A1 | 11/2008 | Desai | |
| 2012/0045348 A1 | 2/2012 | Garry | |
| 2012/0156061 A1 | 6/2012 | Baker et al. | |
| 2012/0234014 A1 | 9/2012 | Reuter et al. | |
| 2012/0234015 A1 | 9/2012 | Reuter | |

* cited by examiner

*Primary Examiner* — Ehud Gartenberg
*Assistant Examiner* — Jared W Pike
(74) *Attorney, Agent, or Firm* — Lorenz & Kopf, LLP

(57) ABSTRACT

A gas turbine engine fuel supply system includes a primary gear pump and a secondary gear pump. The primary gear pump always actively delivers fuel to the downstream fuel system, and is sized to supply 100% of the burn flow needed at a select low demand condition. The secondary gear pump is sized to make up the remainder of the flow at high demand conditions, and actively delivers fuel to the downstream fuel system only during those conditions. To supply discharge fuel pressures in excess of gear pump capability, a supercharger pump is disposed upstream of the primary and secondary gear pumps. The supercharger pump is preferably activated only during high demand conditions as an additional energy conservation measure.

15 Claims, 5 Drawing Sheets

HIGH EFFICIENCY, HIGH PRESSURE GAS TURBINE ENGINE FUEL SUPPLY SYSTEM

CROSS-REFERENCE TO RELATED APPLICATIONS

This application claims the benefit of the benefit of U.S. Provisional Application No. 61/753,595, filed Jan. 17, 2013.

TECHNICAL FIELD

The present invention generally relates to gas turbine engine fuel control, and more particularly relates to a system and method for selectively supplying fuel at multiple pressures to a gas turbine engine.

BACKGROUND

Typical gas turbine engine fuel supply systems include a fuel source, such as a fuel tank, and a main fuel pump that receives fuel drawn from the fuel source and delivers pressurized fuel to the fuel manifolds in the engine combustor via a main supply line. The main fuel pump is typically implemented using a positive displacement pump that is driven directly by the engine gearbox. Thus, the fuel flow supplied by the main fuel pump is proportional to engine speed.

The fixed displacement of a main fuel pump is typically sized to produce the fuel flow that is needed to run the engine at a max demand case, which is typically during engine start-up, where engine speed is relatively low, or during takeoff, where fuel demand is relatively high. As such, at other operating conditions, such as idle or high altitude cruise, the main fuel pump supplies much more fuel than the engine needs. In many instances, the excess fuel is recirculated back to the low pressure pump inlet or some other low pressure point upstream of the main fuel pump.

The known fuel supply systems described above generally operate safely and robustly, but can exhibit certain drawbacks. For example, recirculating the excess fuel from the main fuel pump wastes energy by generating heat, and can lead to undesirably high fuel temperatures. Moreover, developments in turbine engine combustors are driving the required fuel pressures beyond the level that can be produced by a single positive displacement pump (gear or vane).

Hence, there is a need for a gas turbine engine fuel supply system that wastes less energy and supplies higher fuel pressures than presently known systems. The present invention meets this need.

BRIEF SUMMARY

In one embodiment, a gas turbine engine fuel supply system includes a boost pump, a primary gear pump, a secondary gear pump, a supercharger pump, and a pump control valve. The boost pump has a boost pump inlet and a boost pump outlet. The boost pump is adapted to receive a drive torque and is configured, upon receipt thereof, to draw fuel into the boost pump inlet and discharge the fuel from the boost pump outlet. The primary gear pump has a primary gear pump inlet and a primary gear pump outlet. The primary gear pump is adapted to receive a drive torque and is configured, upon receipt thereof, to draw fuel into the primary gear pump inlet and discharge the fuel from the primary gear pump outlet. The secondary gear pump has a secondary gear pump inlet and a secondary gear pump outlet. The secondary gear pump is adapted to receive a drive torque and is configured, upon receipt thereof, to draw fuel into the secondary gear pump inlet and discharge the fuel from the secondary gear pump outlet. The supercharger pump has a supercharger pump inlet and a supercharger pump outlet. The supercharger pump is adapted to receive a drive torque and is configured, upon receipt thereof, to draw fuel into the supercharger pump inlet and discharge the fuel from the supercharger pump outlet. The pump control valve is in fluid communication with the boost pump, primary gear pump, the secondary gear pump, and the supercharger pump, and movable between a first position and a second position. In the first position, the pump control valve fluidly isolates the supercharger pump from the boost pump, the primary gear pump, and the secondary gear pump, and fluidly isolates the primary gear pump outlet from the secondary gear pump outlet. In the second position, the pump control valve fluidly communicates the supercharger pump inlet with the boost pump outlet, fluidly communicates the supercharger pump outlet with the primary gear pump inlet and the secondary gear pump inlet, and fluidly communicates the primary gear pump outlet and the secondary gear pump outlet.

In another embodiment, a gas turbine engine fuel supply system includes a boost pump, a primary gear pump, a secondary gear pump, a supercharger pump, a pump control pilot valve, and a pump control valve. The boost pump has a boost pump inlet and a boost pump outlet. The boost pump is adapted to receive a drive torque and is configured, upon receipt thereof, to draw fuel into the boost pump inlet and discharge the fuel from the boost pump outlet. The primary gear pump has a primary gear pump inlet and a primary gear pump outlet. The primary gear pump is adapted to receive a drive torque and is configured, upon receipt thereof, to draw fuel into the primary gear pump inlet and discharge the fuel from the primary gear pump outlet. The secondary gear pump has a secondary gear pump inlet and a secondary gear pump outlet. The secondary gear pump is adapted to receive a drive torque and is configured, upon receipt thereof, to draw fuel into the secondary gear pump inlet and discharge the fuel from the secondary gear pump outlet. The supercharger pump has a supercharger pump inlet and a supercharger pump outlet. The supercharger pump is adapted to receive a drive torque and is configured, upon receipt thereof, to draw fuel into the supercharger pump inlet and discharge the fuel from the supercharger pump outlet. The pump control pilot valve is configured to supply a hydraulic control signal. The pump control valve is in fluid communication with the boost pump, primary gear pump, the secondary gear pump, and the supercharger pump. The pump control valve is coupled to receive the hydraulic control signal and is configured, in response thereto, to selectively move between a first position and a second position. In the first position, the pump control valve fluidly isolates the supercharger pump from the boost pump, the primary gear pump, and the secondary gear pump, and fluidly isolates the primary gear pump outlet from the secondary gear pump outlet. In the second position, the pump control valve fluidly communicates the supercharger pump inlet with the boost pump outlet, fluidly communicates the supercharger pump outlet with the primary gear pump inlet and the secondary gear pump inlet, and fluidly communicates the primary gear pump outlet and the secondary gear pump outlet.

In yet another embodiment, a method of controlling the supply of fuel to a gas turbine engine includes simultaneously supplying, from a fuel source, fuel to a first gear pump and a second gear pump. A first portion of the fuel is supplied to the gas turbine engine via the first gear pump while a second portion of the fuel is simultaneously recirculated through the second gear pump. Fuel is selectively supplied to the gas turbine engine via the first and second gear pumps by fluidly coupling the first and second gear pumps in parallel, and supplying fuel, from the fuel source, to the first and second gear pumps via a supercharger pump.

Furthermore, other desirable features and characteristics of the gas turbine engine fuel supply system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
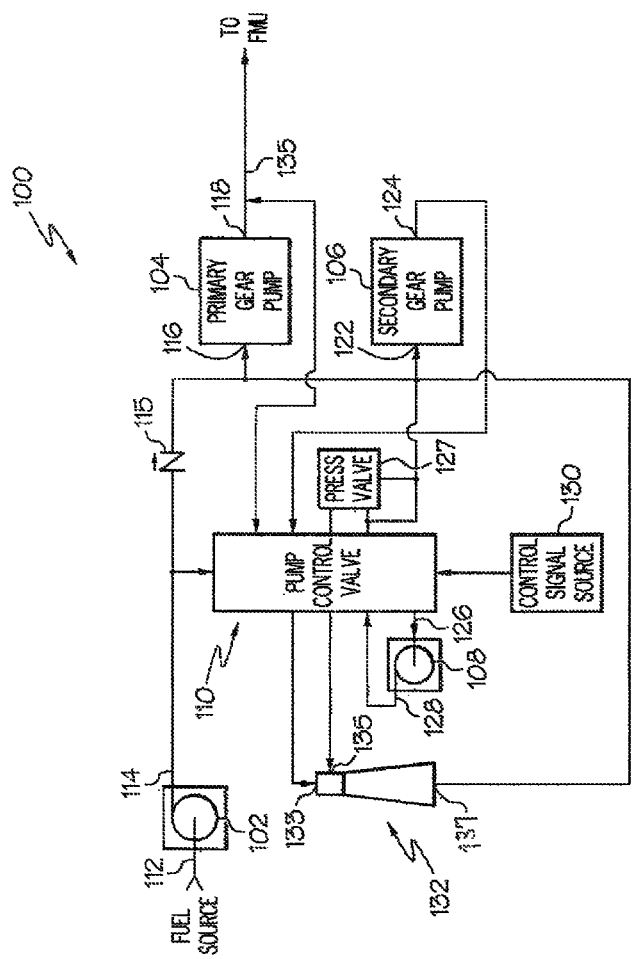
FIG. 1 depicts a functional block diagram of an embodiment of the fuel supply system.

Referring first to FIG. 1, a functional block diagram of an embodiment of the fuel supply system 100 is depicted, and includes a boost pump 102, a primary gear pump 104, a secondary gear pump 106, a supercharger pump 108, and a pump control valve 110. The boost pump 102 includes a boost pump inlet 112 and a boost pump outlet 114. The boost pump inlet 112 is adapted to be in fluid communication with a fuel source, such as a non-illustrated fuel tank. The boost pump outlet 114 is in fluid communication with the pump control valve 110 and, as will be described further below, is selectively in fluid communication with the primary gear pump 104 and the secondary gear pump 106, via, for example, a check valve 115, or in fluid communication with the supercharger pump 108, via the pump control valve 110. The boost pump 102 may be variously implemented, but is preferably implemented as a relatively low horsepower, low speed centrifugal pump. The boost pump 102, regardless of its specific implementation, is adapted to receive a drive torque and is configured, upon receipt thereof, to draw fuel into the boost pump inlet 112 and discharge the fuel from the boost pump outlet 114. The source of drive torque to the boost pump 102 may vary, but in the depicted embodiment the source is a gas turbine engine, and more particularly a gearbox coupled to the gas turbine engine.

The primary gear pump 104 includes a primary gear pump inlet 116 and a primary gear pump outlet 118. The primary gear pump inlet 116 is coupled to selectively receive fuel from either the boost pump 102, via the check valve 115, or the supercharger pump 108, via the pump control valve 110. The primary gear pump 104 is preferably implemented as a positive displacement pump that is adapted to receive a drive torque and is configured, upon receipt of the drive torque, to draw fuel into the primary gear pump inlet 116 and discharge pressurized fuel from the primary gear pump outlet 118 to, for example, a non-illustrated fuel metering unit (FMU). The source of drive torque to the primary gear pump 104 may vary, but in the depicted embodiment the source is the gas turbine engine gearbox. It will be appreciated that the source of drive torque may be the same source that drives the boost pump 102, and can be driven at the same or different speed as the boost pump 102.

The secondary gear pump 106 includes a secondary gear pump inlet 122 and a secondary gear pump outlet 124. The secondary gear pump inlet 122 is also coupled to selectively receive fuel from either the boost pump 102, via the check valve 115, or the supercharger pump 108, via the pump control valve 110. Similar to the primary gear pump 104, the secondary gear pump 106 is adapted to receive a drive torque and is configured, upon receipt of the drive torque, to draw fuel into the secondary gear pump inlet 122 and discharge pressurized fuel from the secondary gear pump outlet 124. Preferably, the drive torque source is also the gas turbine engine gearbox and, as with the primary gear pump 104, it may be the same source that drives the boost pump 102, and can be driven at the same or different speed as the boost pump 102. As will be described further below, the pressurized fuel discharged from the secondary gear pump outlet 124 is supplied, via the pump control valve 110, either back to the secondary gear pump inlet 122, via a pressurizing valve 127, or to the primary gear pump outlet 118.

The supercharger pump 108 includes a supercharger pump inlet 126 and a supercharger pump outlet 128. The supercharger pump inlet and outlet 126, 128 are each in fluid communication with the pump control valve 110. The supercharger pump 108 may be variously implemented, but is preferably implemented as a single stage, relatively high speed centrifugal pump. The supercharger pump 108, regardless of its specific implementation, is adapted to receive a drive torque. As will also be described further below, the supercharger pump 108 is configured, upon receipt of the drive torque, and depending upon the position of the pump control valve 110, to selectively draw fuel into the supercharger pump inlet 126 and discharge the fuel from the supercharger pump outlet 128. Here too, the drive torque source is preferably the gas turbine engine gearbox, but is preferably driven at a higher speed than the boost pump 102, the primary gear pump 104, and the secondary gear pump 106.

The pump control valve 110 is in fluid communication with the boost pump 102, the primary gear pump 104, the secondary gear pump 106, the supercharger pump 108, and, at least in the depicted embodiment, an ejector pump 132. The pump control valve 110 is coupled to receive a control signal and is movable, in response to the control signal, between a first control position and a second control position. In the first control position, the pump control valve 110 fluidly isolates the supercharger pump 108 from the boost pump 102 and the primary gear pump 104, fluidly isolates the primary gear pump outlet 118 from the secondary gear pump outlet 124, and also fluidly couples the secondary gear pump outlet 124 to a motive fluid inlet 133 of the ejector pump 132 and the supercharger pump outlet 128 to a suction fluid inlet 135 of the ejector pump 132. In the second control position, the pump control valve 110 fluidly isolates the secondary gear pump outlet 124 from the motive fluid inlet 133 and the supercharger pump outlet 128 from the suction fluid inlet 135, fluidly communicates the supercharger pump inlet 126 with the boost pump outlet 114, fluidly communicates the supercharger pump outlet 128 with the primary and secondary gear pump inlets 116, 122, and fluidly communicates the primary and secondary gear pump outlets 118, 124. Thus, when the pump control valve 110 is in the first control position (e.g., low demand case), only the primary gear pump 104 supplies pressurized fuel to downstream fuel loads and the supercharger pump 108 is vented to low pressure. However, when the pump control valve 110 is in the second control position (e.g., high demand case), the primary and secondary gear pumps 104, 106 are connected in parallel and both supply pressurized fuel, at an increased pressure, to downstream loads.

It will be appreciated that the pump control valve 110 may be variously configured and implemented. In this regard, it will additionally be appreciated that the control signal supplied to the pump control valve 110 may be electric, pneumatic, hydraulic, or various combinations thereof, and that the source of the control signal 130 may be variously configured and implemented. In a particular embodiment, which is depicted in FIGS. 2 and 3, and which will now be described, the control signal is a hydraulic signal and the control signal source 130 is a controllable pilot valve, referred to herein as a pump control pilot valve 130.

Figure 2:
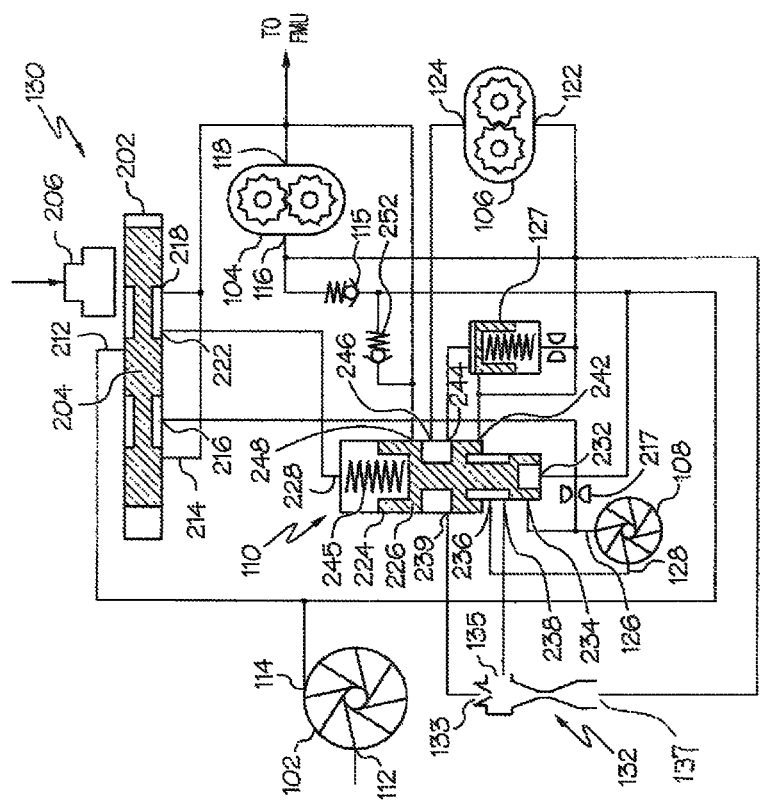
FIGS. 2 and 3 depict detailed schematic representations of one embodiment of the fuel supply system of FIG. 1 in two different operational modes.
Figure 3:
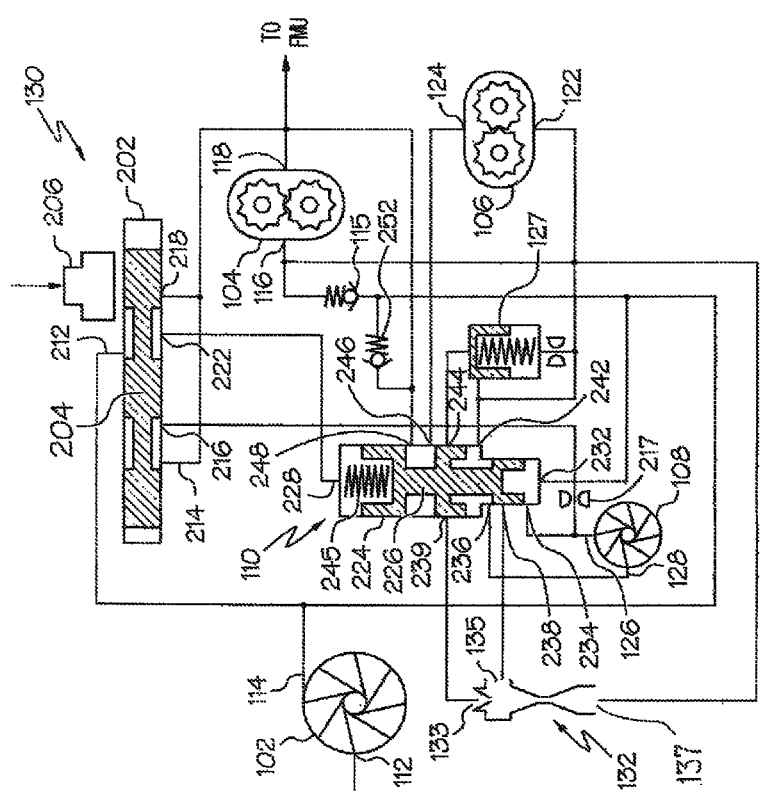

With reference to FIGS. 2 and 3, a more detailed schematic representation of the fuel supply system 100, schematically illustrating embodiments of the pump control valve 110 and the pump control pilot valve 130 in more detail, is depicted. This more detailed representation will now be described, beginning with a detailed description of the pump control pilot valve 130, and followed with a detailed description of the pump control valve 110.

The pump control pilot valve 130 includes a pump control pilot valve body 202, a pump control pilot valve element 204, and a pilot valve actuator 206. The pump control pilot valve body 202 includes a low-pressure supply port 212, a supercharger feed inlet port 214, a supercharger feed outlet port 216, a control pressure inlet port 218, and a control pressure outlet port 222. The low-pressure supply port 212 is in fluid communication with a relatively low-pressure fuel source. In the depicted embodiment, the low-pressure fuel source is the boost pump outlet 114. The supercharger feed inlet port 214 is in fluid communication with the primary gear pump outlet 118, and the supercharger feed outlet port 216 is in fluid communication with the supercharger pump inlet 126, via a flow control orifice 217. The control pressure inlet port 218 is also in fluid communication with the primary gear pump outlet 118, and the control pressure outlet port 222 is in fluid communication with the pump control valve 110.

The pump control pilot valve element 204 is movably disposed within the pump control valve body 202 and is movable between a first pilot position and a second pilot position. In the first pilot position, which is the position depicted in FIG. 2, the pilot valve element 204 dead-heads the low-pressure supply port 212, fluidly isolates the supercharger feed inlet port 214 from the supercharger feed outlet port 216, and fluidly couples the control pressure inlet port 218 to the control pressure outlet port 222. In the second pilot position, which is the position depicted in FIG. 3, the pilot valve element 204 fluidly couples the low-pressure supply port 212 to the control pressure outlet port 222, fluidly couples the supercharger feed inlet port 214 to the supercharger feed outlet port 216, and fluidly isolates the control pressure inlet port 218 from the control pressure outlet port 222.

The pump control pilot valve element 204 is moved between the first and second pilot positions via the pilot valve actuator 206. The pilot valve actuator 206 is adapted to receive a command signal from an external source, such as an engine control (e.g., a FADEC) and is configured, in response to the command signal, to cause the pilot valve element 204 to move between the first and second pilot positions. In the depicted embodiment, the pilot valve actuator 206 is implemented as an electro-hydraulic servo valve (EHSV) that is configured, in response to the command signal, to controllably supply a control fluid pressure to the pump control pilot valve element 204 that moves the pump control pilot valve element 204 between the first and second pilot positions. It will be appreciated that the pilot valve actuator 206 may be variously configured and implemented. For example, it may be implemented using any one of numerous electric, hydraulic, pneumatic, electro-hydraulic, or electro-pneumatic types of actuators.

The pump control valve 110 includes a pump control valve body 224 and a pump control valve element 226. The pump control valve body 224 includes a control signal port 228, a boost pump outlet port 232, supercharger pump inlet port 234, a supercharger pump outlet port 236, a supercharger pump vent port 238, an ejector pump motive supply port 239, a combined gear pump inlet port 242, a pressurizing valve control port 244, a secondary gear pump outlet port 246, and a primary gear pump outlet port 248. The control signal port 228 is in fluid communication with the pump control pilot valve 130, and more specifically with the control pressure outlet port 222, and receives the control signal therefrom. The boost pump outlet port 232 is in fluid communication with the boost pump outlet 114 and receives a portion of the fuel discharged therefrom.

The supercharger pump inlet port 234 is in fluid communication with the supercharger pump inlet 126 and, via the flow orifice 217, the supercharger feed outlet port 216. The supercharger pump outlet port 236 is in fluid communication with the supercharger pump outlet 128. In the depicted embodiment, the supercharger pump vent port 238 is in fluid communication with the suction fluid inlet 135 of the ejector pump, and the ejector pump motive supply port 239 is in fluid communication with the motive fluid inlet 133 of the ejector pump 132. As FIGS. 2 and 3 also depict, the ejector pump 132 additionally includes an ejector pump outlet 137, which is in fluid communication with the primary and secondary gear pump inlets 116, 122.

Figure 4:
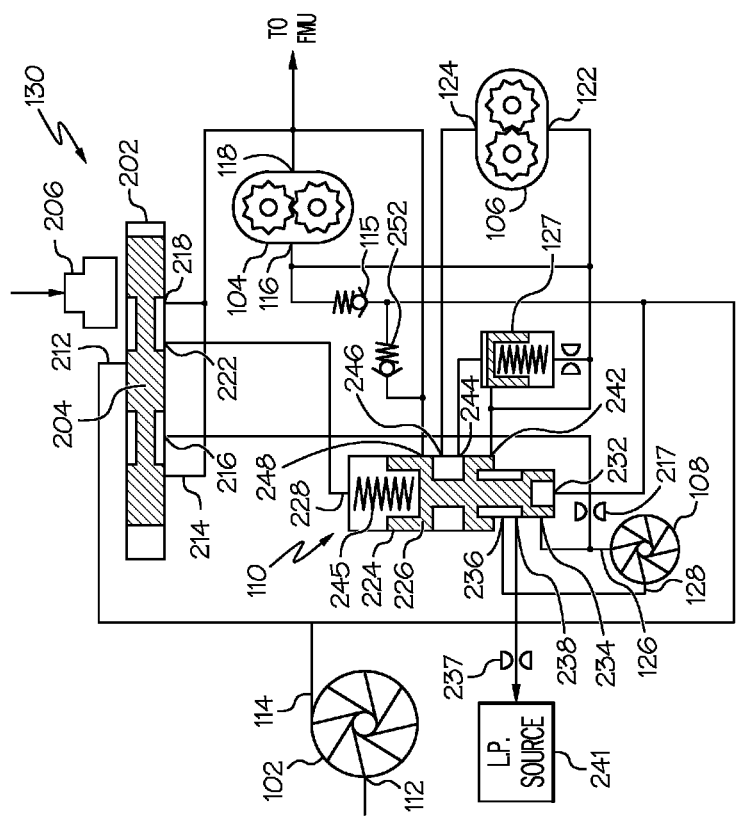
FIGS. 4 and 5 depict detailed schematic representations of an alternative embodiment of the fuel supply system of FIG. 1 in the two different operational modes.
Figure 5:
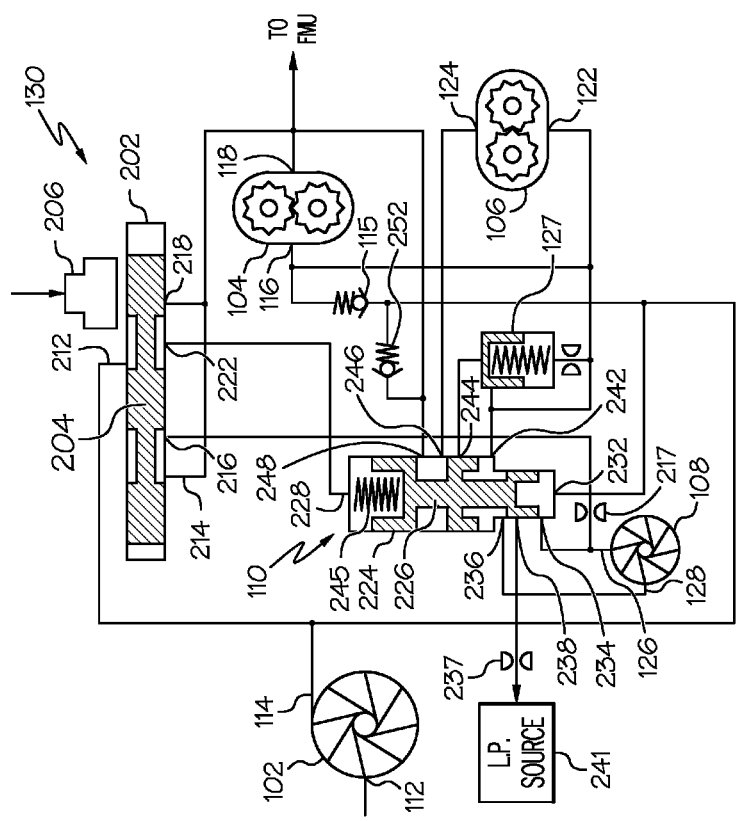

Before proceeding further, it is noted that in other embodiments, such as the one depicted in FIGS. 4 and 5, the system 100 could be implemented without the ejector pump 132. In such embodiments, the control valve 110 does not include the ejector pump motive supply port 239, and the supercharger pump vent port 238 is in fluid communication, via another flow orifice 237, with a relatively low-pressure fluid source 239. The relatively low-pressure fluid source 239 may vary, and may be, for example, a vent to air, such as the atmosphere or the top of the non-illustrated fuel tank, or to one or more other tank-like reservoirs. It is noted that this vent path, as well as the path provided by the ejector pump 132 in FIGS. 1-3, is provided so that the supercharger pump 108 does not overheat by continually pumping trapped fluid when the pump control pilot valve element 204 is in the first pilot position and the pump control valve 110 is in the first control position, and thus the fluid inlet paths to the supercharger pump 108 are blocked. The supercharger pump 108 will not overheat if it is spinning in air and/or vapor. With the embodiment depicted in FIGS. 1-3, the supercharger pump 108 is spinning in fuel vapor, and with the embodiment depicted in FIGS. 4 and 5, it is spinning in air.

Returning now to the description of FIGS. 2 and 3, the combined pump inlet port 242 is in fluid communication with the secondary gear pump inlet 122 and the pressurizing valve 128. The pressurizing valve control port 244 is also in fluid communication with the pressurizing valve 128. The secondary gear pump outlet port 246 is in fluid communication with the secondary gear pump outlet 124, and the primary gear pump outlet port 248 is in fluid communication with the primary gear pump outlet 118.

The pump control valve element 226 is movably disposed within the pump control valve body 224. The pump control valve element 226 is responsive to the control signal supplied from the pump control pilot valve 130 to move between a first control position and a second control position. In particular, as was noted above, when the pump control pilot valve element 204 is in the first pilot position, the control pressure inlet port 218 is fluidly coupled to the control pressure outlet port 222. Because the control signal port 228 is in fluid communication with the control pressure outlet port 222, the control signal supplied to the control signal port 228 is a relatively high fluid pressure signal from the primary gear pump outlet 118. This relatively high fluid pressure signal, together with a spring force supplied from a bias spring 245, overcomes other fluid pressure forces acting on the pump control valve element 226 to move (or maintain) the pump control valve element 226 to (or in) the first control position.

In the first control position, which is the position depicted in FIG. 2, the pump control valve element 226 fluidly isolates the supercharger pump inlet port 234, and thus the supercharger pump inlet 126, from the boost pump outlet 114, and fluidly couples the supercharger pump outlet port 236, and thus the supercharger pump outlet 128, to the supercharger pump vent port 238. The pump control valve element 226 also couples the secondary gear pump outlet port 246 to the pressurizing valve control port 244, and fluidly isolates the secondary gear pump outlet port 246 from the primary gear pump outlet port 248. Thus, as previously noted, only the primary gear pump 104 supplies pressurized fuel to the downstream fuel loads. At the same time, the secondary gear pump 106 is routed to the pressurizing valve 128, which idles the pressure rise of the secondary gear pump 106 to a relatively low differential pressure, thereby minimizing power extraction and heat generation. It is additionally noted that the supercharger pump 108 is preferably disengaged from a fluid source, further reducing power extraction.

When the pump control pilot valve element 204 is in the second pilot position, the low-pressure supply port 212 is fluidly coupled to the control pressure outlet port 222, the supercharger feed inlet port 214 is fluidly coupled to the supercharger feed outlet port 216, and the control pressure inlet port 218 is fluidly isolated from the control pressure outlet port 222. Because the control signal port 228 is in fluid communication with the control pressure outlet port 222, the control signal supplied to the control signal port 228 is a relatively low fluid pressure signal from the boost pump outlet 114. The combined fluid pressure forces acting on the pump control valve element 226 overcome the relatively low fluid pressure signal and the spring force supplied from the bias spring 245 to move (or maintain) the pump control valve element 226 to (or in) the second control position.

In the second control position, which is the position depicted in FIG. 3, the pump control valve element 226 fluidly couples the supercharger pump inlet port 234, and thus the supercharger pump inlet 126, to the boost pump outlet 114, and fluidly isolates the supercharger pump outlet port 236 from the supercharger pump vent port 238. However, the pump control valve element 226 fluidly couples the supercharger pump outlet port 236, and thus the supercharger pump outlet 128, to the combined gear pump inlet port 242, and thus to the primary and secondary gear pump inlets 116, 122. The pump control valve element 226 fluidly isolates the secondary gear pump outlet port 246 from the pressurizing valve control port 244, and fluidly couples the secondary gear pump outlet port 246 to the primary gear pump outlet port 248, and thus to the primary gear pump outlet 118. Thus, as was also previously noted, the primary and secondary gear pumps 104, 106 are connected in parallel and both supply pressurized fuel to downstream fuel loads at an increased pressure.

It should be noted that the system 100 is configured such that when the pump control pilot valve element 204 moves from in the first pilot position to the second pilot position, the pump control valve element 226 does not instantaneously move from the first control position to the second control position. Rather, the pump control valve element 226 slews to the second control position when the fuel vapor in which the supercharger pump 108 was spinning is recompressed into fluid (or the air in which the supercharger pump 108 was spinning is purged back to the relatively low-pressure fluid source 239, and fluid pressure from the supercharger pump 108 builds up in the pump control valve body 224. This recompressing/purging feature prevents a slug of air from being introduced into the downstream fuel system. It is further noted that the depicted system 100 includes an optional pump relief valve 252, fluidly coupled between the primary gear pump outlet 118 and the boost pump outlet 114.

The gas turbine engine fuel supply system described herein wastes less energy and supplies higher fuel pressures (when needed) than presently known systems. The system includes two positive displacement pumps, a primary pump and a secondary pump, positioned in parallel. The primary pump always actively delivers flow to the downstream fuel system, and is sized to supply 100% of the fuel flow needed at a select low demand condition, typically engine cruise or ground idle operations, whichever is higher. The secondary pump is sized to make up the remainder of the flow at the high demand conditions, and is actively delivering fuel to the downstream fuel system only during those conditions. At low demand conditions, the output of the secondary pump is routed back to its inlet but at a much lower pressure, thereby wasting less energy. To supply higher fuel pressure, a separate high-speed centrifugal pump (a supercharger pump) is disposed upstream of the primary and secondary pumps to raise the inlet pressures thereof, and limit overall pressure rise to manageable levels. The supercharger pump can also be a source of waste energy, so it is preferably activated only during high demand conditions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine fuel supply system, comprising:
   a boost pump having a boost pump inlet and a boost pump outlet, the boost pump adapted to receive a drive torque and configured, upon receipt thereof, to draw fuel into the boost pump inlet and discharge the fuel from the boost pump outlet;
   a primary gear pump having a primary gear pump inlet and a primary gear pump outlet, the primary gear pump adapted to receive a drive torque and configured, upon receipt thereof, to draw fuel into the primary gear pump inlet and discharge the fuel from the primary gear pump outlet;
   a secondary gear pump having a secondary gear pump inlet and a secondary gear pump outlet, the secondary gear pump adapted to receive a drive torque and configured, upon receipt thereof, to draw fuel into the secondary gear pump inlet and discharge the fuel from the secondary gear pump outlet;
   a supercharger pump having a supercharger pump inlet and a supercharger pump outlet, the supercharger pump adapted to receive a drive torque and configured, upon receipt thereof, to draw fuel into the supercharger pump inlet and discharge the fuel from the supercharger pump outlet; and
   a pump control valve in fluid communication with the boost pump, primary gear pump, the secondary gear pump, and the supercharger pump, and movable between a first position and a second position,
   wherein:
      in the first position, the pump control valve (i) fluidly isolates the supercharger pump from the boost pump, the primary gear pump, and the secondary gear pump and (ii) fluidly isolates the primary gear pump outlet from the secondary gear pump outlet,
      in the second position, the pump control valve fluidly communicates the supercharger pump inlet with the boost pump outlet, fluidly communicates the supercharger pump outlet with the primary gear pump inlet and the secondary gear pump inlet, and fluidly communicates the primary gear pump outlet and the secondary gear pump outlet.

2. The system of claim 1, wherein the pump control valve is coupled to receive a control signal and is configured, in response thereto, to selectively move between the first position and the second position.

3. The system of claim 2, further comprising:
   a control signal source configured to supply the control signal to the pump control valve.

4. The system of claim 3, wherein:
   the control signal is a hydraulic signal; and
   the control signal source comprises a controllable pump control pilot valve.

5. The system of claim 4, wherein the pump control pilot valve comprises:
   a pump control pilot valve body including a low-pressure supply port, a supercharger feed inlet port, a supercharger feed outlet port, a control pressure inlet port, and a control pressure outlet port; the low-pressure supply port in fluid communication with the boost pump outlet, the supercharger feed inlet port in fluid communication with the primary gear pump outlet, and the supercharger feed outlet port in fluid communication with the supercharger pump inlet, the control pressure inlet port in fluid communication with the primary gear pump outlet, the control pressure outlet port in fluid communication with the pump control valve;
   a pump control pilot valve element movably disposed within the pump control valve body, and is movable between a first pilot position and a second pilot position,
   wherein:
      in the first pilot position the pilot valve element deadheads the low-pressure supply port, fluidly isolates the supercharger feed inlet port from the supercharger feed outlet port, and fluidly couples the control pressure inlet port to the control pressure outlet port, and
      in the second pilot position, the pilot valve element fluidly couples the low-pressure supply port to the control pressure outlet port, fluidly couples the supercharger feed inlet port to the supercharger feed outlet port, and fluidly isolates the control pressure inlet port from the control pressure outlet port.

6. The system of claim 5, further comprising:
   a pilot valve actuator, the pilot valve actuator adapted to receive a command signal and configured, in response to the command signal, to cause the pilot valve element to move between the first position and the second pilot position.

7. The system of claim 6, wherein the pilot valve actuator comprises an electro-hydraulic servo valve (EHSV) configured to be responsive to the command signal to controllably supply a control fluid pressure to the pump control pilot valve element that moves the pump control pilot valve element between the first and second pilot positions.

8. The system of claim 4, wherein the pump control valve comprises:
   a pump control valve body that includes a control signal port, a boost pump outlet port, a supercharger pump inlet port, a supercharger pump outlet port, a supercharger pump vent port, an ejector pump motive supply port, a combined gear pump inlet port, a pressurizing valve control port, a secondary gear pump outlet port, and a primary gear pump outlet port, the control signal port in fluid communication with the pump control pilot valve and receives the control signal therefrom, the boost pump outlet port in fluid communication with the boost pump outlet to receive a portion of the fuel discharged therefrom, the supercharger pump inlet port in fluid communication with the supercharger pump inlet and the supercharger feed outlet port, the supercharger pump outlet port in fluid communication with the supercharger pump outlet, the combined pump inlet port in fluid communication with the primary gear pump inlet, the secondary gear pump inlet, and a pressurizing valve, the pressurizing valve control port in fluid communication with the pressurizing valve, the secondary gear pump outlet port in fluid communication with the secondary gear pump outlet, the primary gear pump outlet port in fluid communication with the primary gear pump outlet, and a pump control valve element is movably disposed within the pump control valve body, the pump control valve element responsive to the control signal to move between a first control position and a second control position, wherein:
  in the first control position, the pump control valve element fluidly isolates the supercharger pump inlet from the boost pump outlet, fluidly couples the supercharger pump outlet to the supercharger pump vent port, fluidly couples the secondary gear pump outlet port to the pressurizing valve control port, fluidly couples the secondary gear pump outlet port to the ejector pump motive supply port, and fluidly isolates the secondary gear pump outlet port from the primary gear pump outlet port, and
  in the second control position, the pump control valve element fluidly couples the supercharger pump inlet to the boost pump outlet, fluidly isolates the supercharger pump outlet port from the supercharger pump vent port, fluidly couples the supercharger pump outlet to the primary and secondary gear pump inlets, fluidly isolates the secondary gear pump outlet port from the pressurizing valve control port, fluidly isolates the secondary gear pump outlet from the ejector pump motive supply port, and fluidly couples the secondary gear pump outlet port to the primary gear pump outlet, to thereby connect the primary and secondary gear pumps in parallel.

9. The system of claim 1, further comprising:
an ejector pump coupled to the pump control valve and configured to remove fuel from the supercharger pump when the pump control valve is in the first position.

10. A gas turbine engine fuel supply system, comprising:
a boost pump having a boost pump inlet and a boost pump outlet, the boost pump adapted to receive a drive torque and configured, upon receipt thereof, to draw fuel into the boost pump inlet and discharge the fuel from the boost pump outlet;
a primary gear pump having a primary gear pump inlet and a primary gear pump outlet, the primary gear pump adapted to receive a drive torque and configured, upon receipt thereof, to draw fuel into the primary gear pump inlet and discharge the fuel from the primary gear pump outlet;
a secondary gear pump having a secondary gear pump inlet and a secondary gear pump outlet, the secondary gear pump adapted to receive a drive torque and configured, upon receipt thereof, to draw fuel into the secondary gear pump inlet and discharge the fuel from the secondary gear pump outlet;
a supercharger pump having a supercharger pump inlet and a supercharger pump outlet, the supercharger pump adapted to receive a drive torque and configured, upon receipt thereof, to draw fuel into the supercharger pump inlet and discharge the fuel from the supercharger pump outlet;
a pump control pilot valve configured to supply a hydraulic control signal; and
a pump control valve in fluid communication with the boost pump, primary gear pump, the secondary gear pump, and the supercharger pump, the pump control valve coupled to receive the hydraulic control signal and configured, in response thereto, to selectively move between a first position and a second position, wherein:
  in the first position, the pump control valve (i) fluidly isolates the supercharger pump from the boost pump, the primary gear pump, and the secondary gear pump and (ii) fluidly isolates the primary gear pump outlet from the secondary gear pump outlet,
  in the second position, the pump control valve fluidly communicates the supercharger pump inlet with the boost pump outlet, fluidly communicates the supercharger pump outlet with the primary gear pump inlet and the secondary gear pump inlet, and fluidly communicates the primary gear pump outlet and the secondary gear pump outlet.

11. The system of claim 10, wherein the pump control pilot valve comprises:
a pump control pilot valve body including a low-pressure supply port, a supercharger feed inlet port, a supercharger feed outlet port, a control pressure inlet port, and a control pressure outlet port; the low-pressure supply port in fluid communication with the boost pump outlet, the supercharger feed inlet port in fluid communication with the primary gear pump outlet, and the supercharger feed outlet port in fluid communication with the supercharger pump inlet, the control pressure inlet port in fluid communication with the primary gear pump outlet, the control pressure outlet port in fluid communication with the pump control valve;
a pump control pilot valve element movably disposed within the pump control valve body, and is movable between a first pilot position and a second pilot position, wherein:
  in the first pilot position the pilot valve element deadheads the low-pressure supply port, fluidly isolates the supercharger feed inlet port from the supercharger feed outlet port, and fluidly couples the control pressure inlet port to the control pressure outlet port, and
  in the second pilot position, the pilot valve element fluidly couples the low-pressure supply port to the control pressure outlet port, fluidly couples the supercharger feed inlet port to the supercharger feed outlet port, and fluidly isolates the control pressure inlet port from the control pressure outlet port.

12. The system of claim 11, further comprising:
a pilot valve actuator, the pilot valve actuator adapted to receive a command signal and configured, in response to the command signal, to cause the pilot valve element to move between the first position and the second pilot position.

13. The system of claim 12, wherein the pilot valve actuator comprises an electro-hydraulic servo valve (EHSV) configured to be responsive to the command signal to controllably supply a control fluid pressure to the pump control pilot valve element that moves the pump control pilot valve element between the first and second pilot positions.

14. The system of claim 10, wherein the pump control valve comprises:

a pump control valve body that includes a control signal port, a boost pump outlet port, a supercharger pump inlet port, a supercharger pump outlet port, a supercharger pump vent port, an ejector pump motive supply port, a combined gear pump inlet port, a pressurizing valve control port, a secondary gear pump outlet port, and a primary gear pump outlet port, the control signal port in fluid communication with the pump control pilot valve and receives the control signal therefrom, the boost pump outlet port in fluid communication with the boost pump outlet to receive a portion of the fuel discharged therefrom, the supercharger pump inlet port in fluid communication with the supercharger pump inlet and the supercharger feed outlet port, the supercharger pump outlet port in fluid communication with the supercharger pump outlet, the combined pump inlet port in fluid communication with the primary gear pump inlet, the secondary gear pump inlet, and a pressurizing valve, the pressurizing valve control port in fluid communication with the pressurizing valve, the secondary gear pump outlet port in fluid communication with the secondary gear pump outlet, the primary gear pump outlet port in fluid communication with the primary gear pump outlet, and a pump control valve element is movably disposed within the pump control valve body, the pump control valve element responsive to the control signal to move between a first control position and a second control position, wherein:
in the first control position, the pump control valve element fluidly isolates the supercharger pump inlet from the boost pump outlet, fluidly couples the supercharger pump outlet to the supercharger pump vent port, fluidly couples the secondary gear pump outlet port to the pressurizing valve control port, couples the secondary gear pump outlet port to the ejector pump motive supply port, and fluidly isolates the secondary gear pump outlet port from the primary gear pump outlet port, and in the second control position, the pump control valve element fluidly couples the supercharger pump inlet to the boost pump outlet, fluidly isolates the supercharger pump outlet port from the supercharger pump vent port, fluidly couples the supercharger pump outlet to the primary and secondary gear pump inlets, fluidly isolates the secondary gear pump outlet port from the pressurizing valve control port, fluidly isolates the secondary gear pump outlet from the ejector pump motive supply port, and fluidly couples the secondary gear pump outlet port to the primary gear pump outlet, to thereby connect the primary and secondary gear pumps in parallel.

15. The system of claim 10, further comprising:
an ejector pump coupled to the pump control valve and configured to remove fuel from the supercharger pump when the pump control valve is in the first position.

* * * * *